United States Patent

[11] 3,629,813

[72] Inventor Hans Drenkelfort
 Kiel-Elmschenhagen, Germany
[21] Appl. No. 846,415
[22] Filed July 31, 1969
[45] Patented Dec. 21, 1971
[73] Assignee Electroacustic Gesellschaft m.b.H.
 Kiel, Germany
[32] Priority Aug. 3, 1968
[33] Germany
[31] P 17 66 881.4

[54] METHOD AND APPARATUS FOR ECHO-
 SOUNDING OF SHORT DISTANCES
 27 Claims, 21 Drawing Figs.
[52] U.S. Cl. .................................................... 340/3 R,
 340/3 C, 343/13 R
[51] Int. Cl. ..................................................... G01s 9/68
[50] Field of Search .......................................... 340/1, 3, 3
 C; 343/13

[56] References Cited
 UNITED STATES PATENTS
2,735,999   2/1956   Ross .............................  340/3

Primary Examiner—Richard A. Farley
Attorneys—Curt M. Avery, Arthur E. Wilfond, Herbert L. Lerner and Daniel J. Tick ABSTRACT: An echo-sounding method and apparatus for measuring short distances, particularly shallow depths, with the aid of a periodically moving indicator member whose indicating action is triggered in dependence upon the time elapsing from the emission moment of the pulse to the reception moment of the echo. For improving the resolution of indication at short distances, the time is expanded by continuously interposing between the echo reception moment and the triggering moment, a delay which increases in proportion to the length of the pulse travel time. For this purpose a triangular wave voltage is generated, the ascending portion of the wave commencing to ascend at the moment of pulse emission and to decline at the moment of echo reception. Concurrently with the triangular wave voltage there is provided an auxiliary voltage, for example of rectangular or trapezoidal wave shape, which has a steep lagging flank coincident with the end of the triangular wave. A trigger pulse derived from the steep lagging flank controls the action of the moving indicator member. Preferably the triangular wave voltage is obtained by supplying a constant current charge to a capacitor commencing with the moment of pulse emission, and changing from charging to constant current discharging of the capacitor under control by the arrival of the echo.

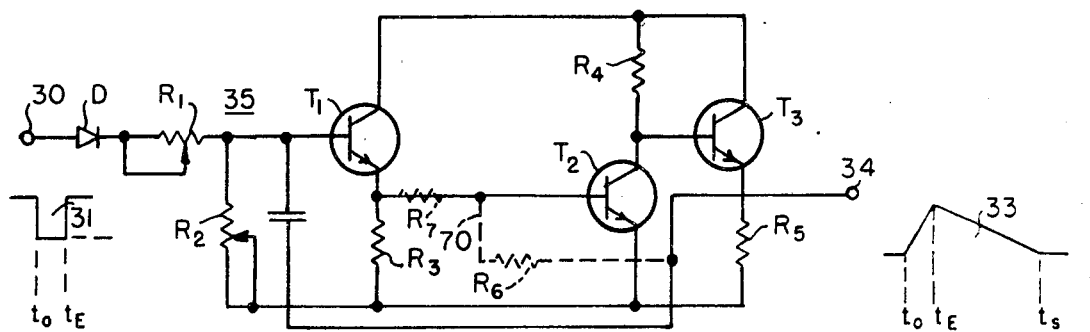
FIG.4
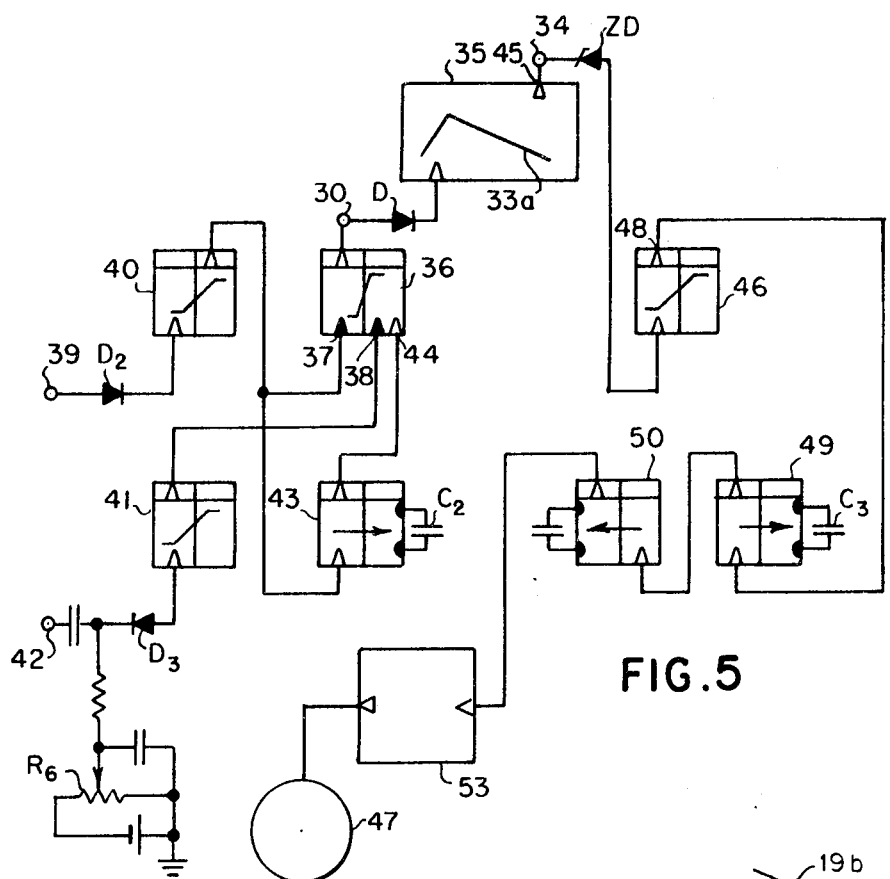
FIG.5
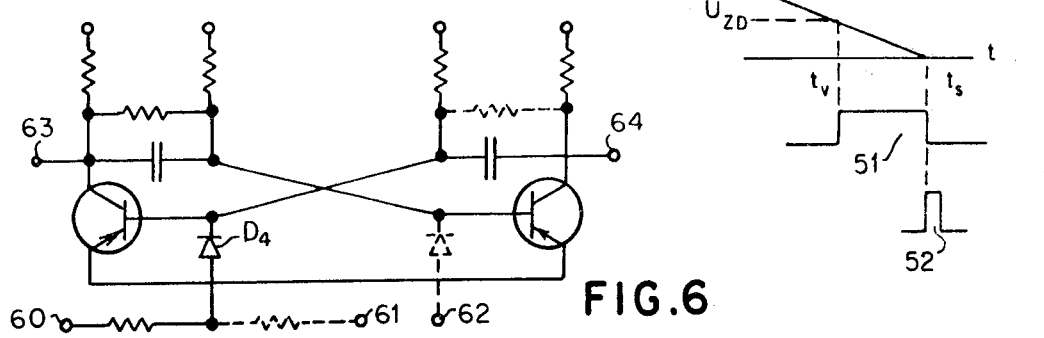
FIG.5a
FIG.6

3,629,813
FIG. 14
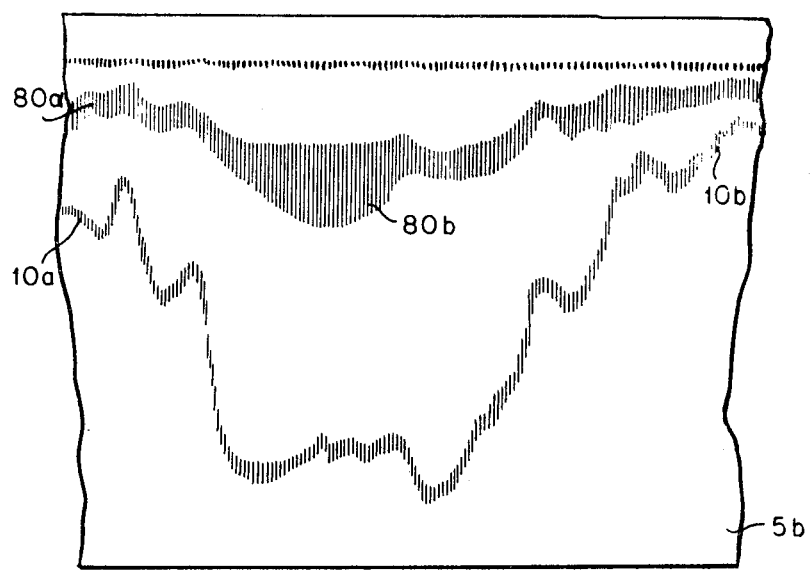
FIG. 15
FIG. 7
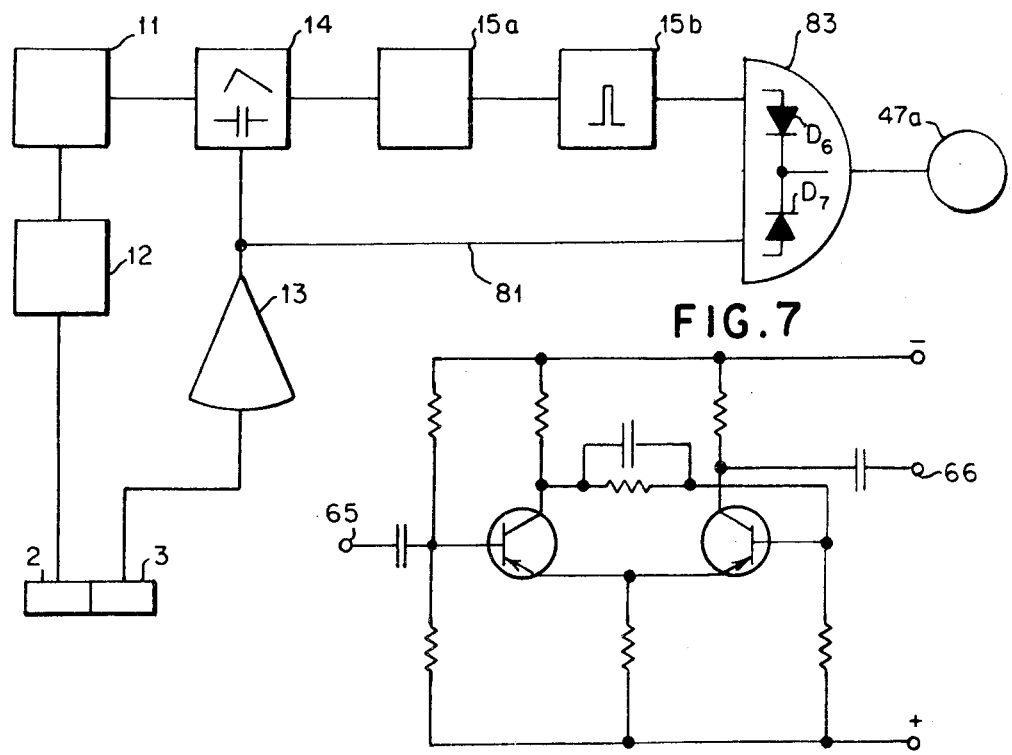

PATENTED DEC 21 1971 3,629,813
SHEET 5 OF 5
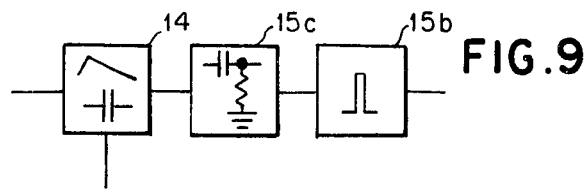
FIG.9
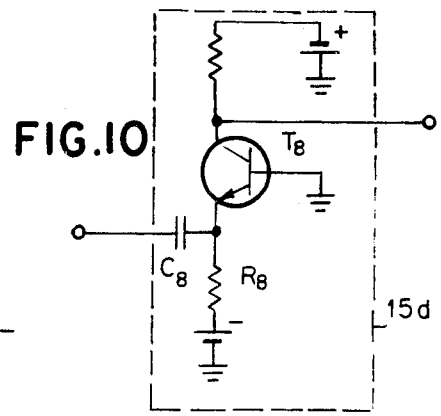
FIG.10
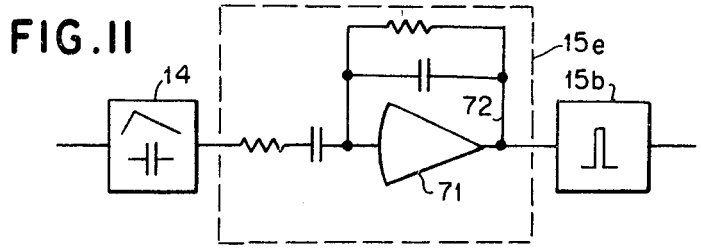
FIG.11
FIG.13
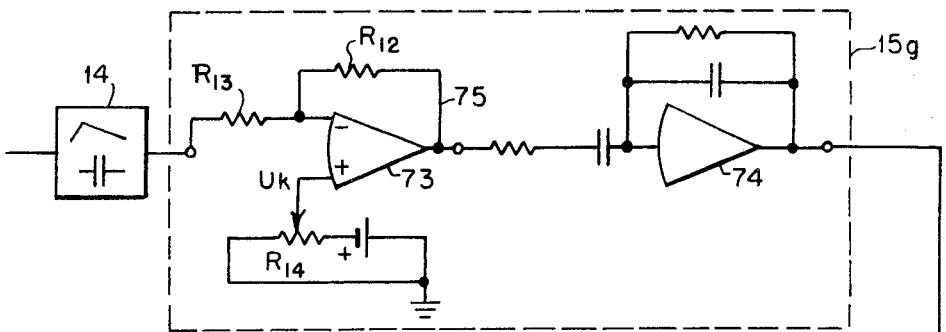
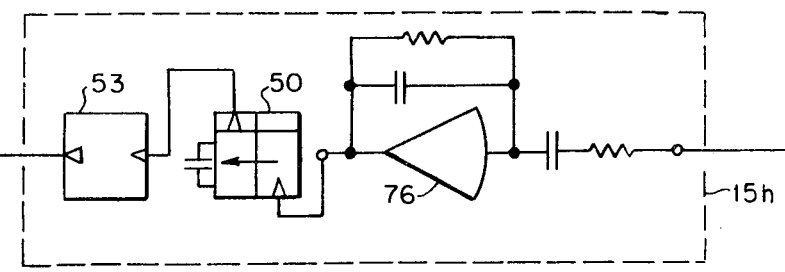
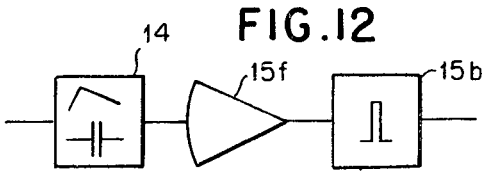
FIG.12
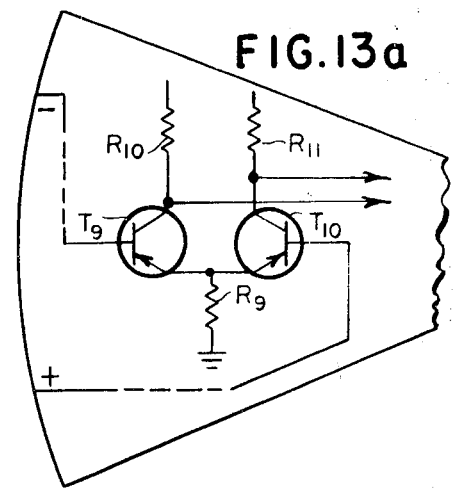
FIG.13a
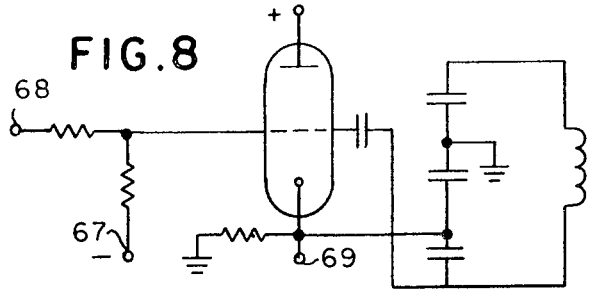
FIG.8

METHOD AND APPARATUS FOR ECHO-SOUNDING OF SHORT DISTANCES

My invention relates to methods and apparatus for measuring short distances, particularly shallow depths, with the aid of a stylus or other indicator member that is mechanically driven to perform a periodic sweep motion over an indicating or recording surface, the indicator member during sequential sweeps, being actuated to perform an indication in dependence upon the pulse travel time from the moment of pulse emission to the moment of echo reception. More particularly, my invention relates to echo-sounding methods and systems in which the resolution of the indication is improved by expanding the pulse travel time within the echo-receiving equipment by continuously adding to the actual travel time an interval of delay which increases in proportion to the actual travel time.

Methods and apparatus of this type are known as such (German Pat. No. 961,954); and it is also known, and preferable for the purposes of my invention, to have the pulse delay interval increase in linear proportion to the pulse travel time, while also providing for a linear scale of indication in the receiving equipment.

The known echo-sounding method and equipment, however, no longer satisfies present day requirements as to accuracy and is not satisfactorily applicable for such small depths as must now be taken into consideration on modern supertankers, as well as for logging operations so close to shore or in such shallow waters as have become of interest for oil-prospecting purposes. Modern tankers for example, require exactly determining the navigational conditions that still permit utilizing such tankers to the utmost limits of feasible operation, so that they can enter, without being endangered, ports originally not intended for vessels of such a large size. Thus, it has become possible to purposely take advantage of high tide and permit a glancing contact with the sea bottom, in order to have a supertanker enter a port normally too small for such vessels. A prerequisite for such navigation is the necessity of continuously observing the spacing of the keel from the bottom of the sea channel, down to the centimeter range, and such small distances must be continuously indicated in a navigational meaningful manner, this being a particularly stringent difficulty. The same requirements also apply, for example, to depth sounding in waters close to the shore, such as for the supervision of sandbanks or the changes of such banks occurring with time.

Although cathode-ray tubes operate extremely rapidly, this does not solve the problem if a short sandbank in the entrance channel of a port is to be traveled over while permitting the vessel to just touch the bottom. For such purposes, as well as for logging near the shore, a profile recording of the sea bottom is needed so that the contour of the sea bottom permits estimating the risk involved or recognizing the change that has occurred with time. Indicating or recording apparatus capable of furnishing such a profile of the bottom are available in the form of mechanical recording equipment which write the result of many individual soundings beside each other and thus furnish a profile or bottom contour.

With indicating methods and devices of such kind, requiring mechanically driven components, the scale of indication is limited to operations at relatively large distance of the sea bottom or other reflector. This is because an increase in imaging scale or resolving power is predicated upon a correspondingly faster motion of the recording mechanism, but the speed of this mechanism cannot be increased at will with economically reasonable means. As a consequence, the echoes resulting from near reflections appear very close to the indication of the zero sound which indicate the starting point of the pulse emission. Hence the indication of a shallow depth, particularly in the range of centimeters, cannot be recorded in sufficient distinction from the zero signals.

It is therefore an object of my invention, relating to methods and apparatus generally of the above-mentioned types, to accurately increase the scale of indication for any given sweep-travel speed of the mechanically driven indicator or without the necessity of increasing the speed of the indicator.

Another object of my invention, akin to the one just mentioned, is to improve echo-sounding systems with strip-chart recorders so as to furnish a recorded image of the sea bottom profile in clear distinction and separation from the recorded line of zero signals, without aggravating the requirements to be met by the design or speed of the stylus sweep mechanism.

To attain these and such other objects as will become apparent hereinafter, and in accordance with a feature of my invention, I improve an echo-sounding method of the initially mentioned kind by generating a triangular wave voltage which commences at the moment of pulse emission and at the moment of echo reception; starts to decline down to its end at zero voltage; and I further generate concurrently with the triangular wave voltage an auxiliary voltage preferably of rectangular or trapezoidal wave shape, which has a steep lagging flank coincident with the zero end of the triangular wave. From this steep rear flank of the auxiliary voltage I derive a trigger pulse which controls the indicating action of the traveling stylus or other indicator.

According to another feature of my invention, the triangular wave voltage is produced by first applying to a capacitor a constant current charge commencing with the moment of pulse emission, and then changing at the moment of echo reception to a constant current discharge of the capacitor.

According to further features of my invention the auxiliary voltage having the steep lagging flank coincident with the end of the triangular voltage wave is released by, or derived from the triangular wave voltage. This is done by comparing the lagging flank amplitude with a discrete potential of the capacitor triangular voltage or some other suitable reference potential, or by differentiating the triangular voltage, or by applying additional amplification. According to still other features of my invention the trigger pulse is obtained by differentiating the auxiliary voltage and is applied for releasing a pulse of writing voltage proper.

The above-mentioned and other objects, advantages, and features of my invention will be apparent from, and will be set forth in, the following description of embodiments of apparatus according to the invention illustrated by way of example on the accompanying drawings, in which.

Figure 1:
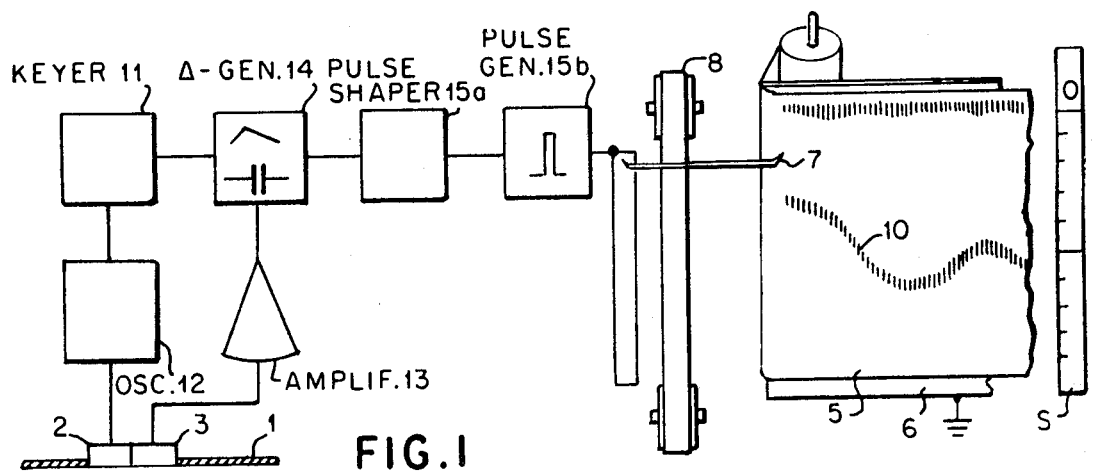
FIG. 1 is a block diagram of a complete echo-sounding system according to the invention.
Figure 2:
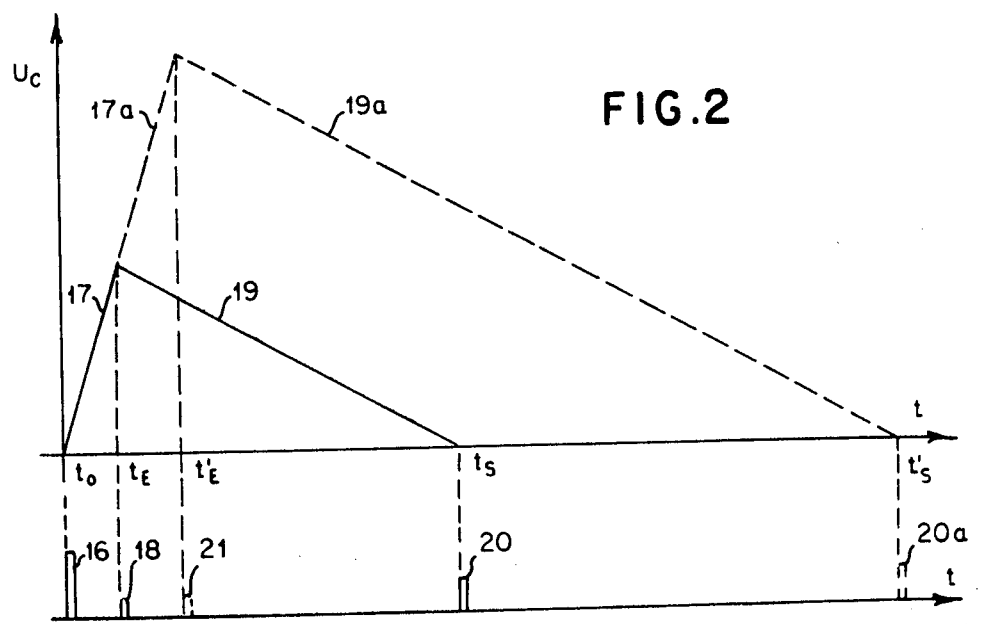
FIG. 2 is a voltage-time graph explanatory of the electronic scale expansion obtained according to the invention.
Figure 3:
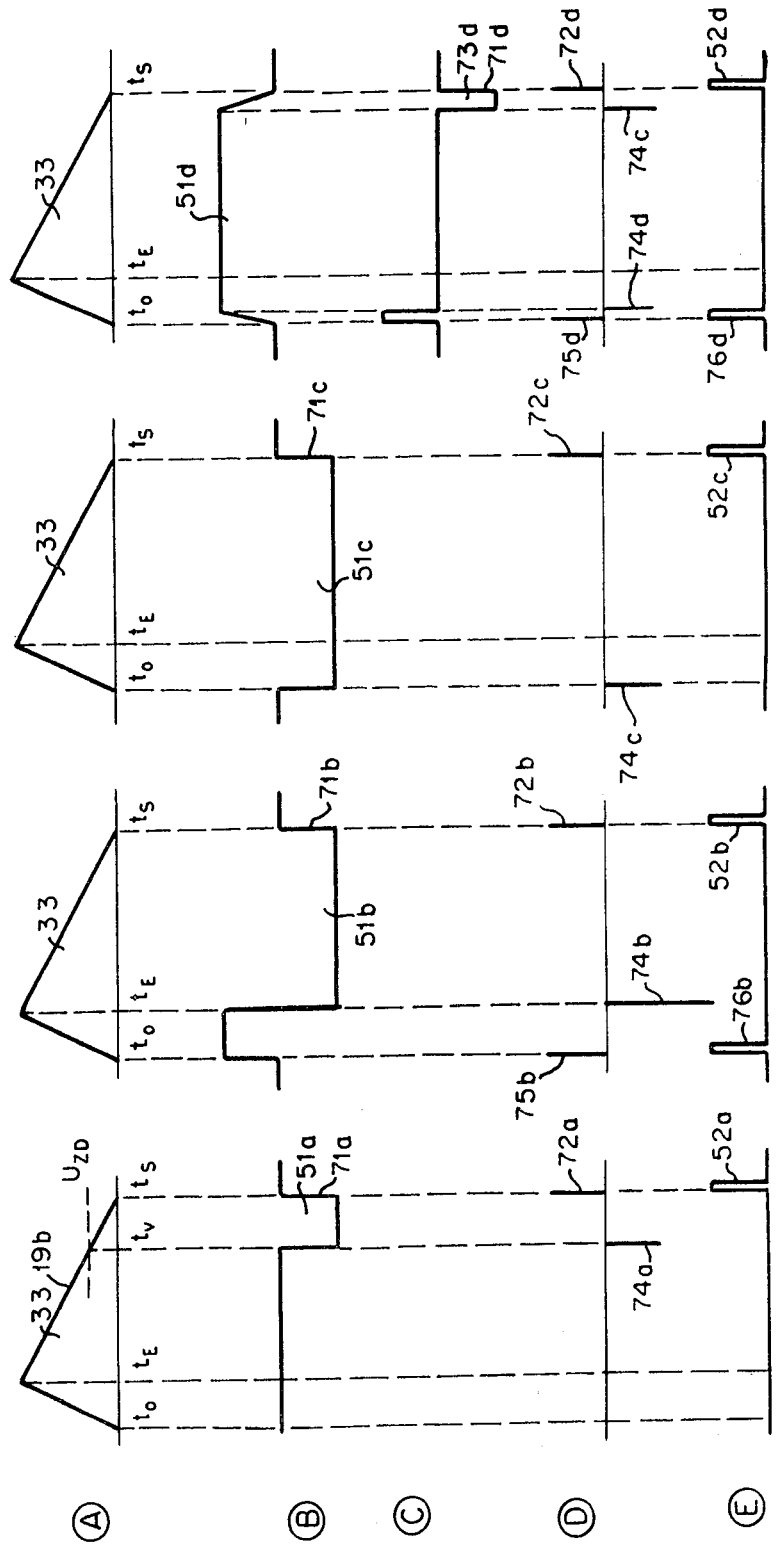

FIGS. 3a, 3b, 3c, and 3d are four respective sets of pulse diagrams explanatory of the method and apparatus according to the invention and relating to four different ways respectively of utilizing the geometrically correct expansion apparent from FIG. 2;

FIG. 4 exemplifies a circuit diagram of a triangular wave voltage generator according to FIG. 1 for producing a triangular wave configuration as shown in FIGS. 2 and 3a to 3d;

FIG. 5 shows diagrammatically an echo-sounding system of a more sophisticated and preferred circuitry as compared with FIG. 1; and FIG. 5a is an explanatory pulse-time graph relating to FIG. 5;

FIGS. 6, 7, and 8 are detailed circuit diagrams of respective components in the circuitry shown in FIG. 5;

FIG. 9 is a block diagram showing a modified portion of a system otherwise corresponding to FIG. 1;

FIG. 10 is the circuit diagram of the differentiating auxiliary voltage generator which forms part of the modified system shown in FIG. 9;

FIG. 11 is a combined block and circuit diagram similar to FIG. 9 but comprising a combination of an amplifying and differentiating generator for producing the auxiliary voltage;

FIG. 12 is a block diagram of still another modification in a system otherwise corresponding to FIG. 1 but equipped with a high-gain amplifying generator for producing the auxiliary voltage;

FIG. 13 is a circuit diagram of still another system according to the invention, comprising another combination of an amplifying and differentiating auxiliary-voltage generator; and FIG. 13a shows circuit details of an operation amplifier according to FIG. 13;

FIG. 14 exemplifies a typical record on a strip chart obtained according to the invention; and FIG. 15 illustrates a modified block diagram of the particular system with which the record of FIG. 14 is obtained.

Shown in FIG. 1 is a small portion of the hull 1 of a vessel in the vicinity of an electric-sonic pulse transducer 2 and a sonic-electric echo transducer 3. The bottom of a port entrance channel is schematically shown at 4 though, for explanation, not true to scale. The navigator wants to obtain an image of the bottom contour 4 in the echo indication that appears recorded on his sonar equipment.

It is known and customary to produce the recording on a tape of current-sensitive paper which advances for example from the left to the right in FIG. 1, after each individual sounding operation by one uniform step and which is kept taut while passing over a metallic backing plate 6 which is grounded and constitutes a counter electrode to a stylus 7. The stylus travels transversely to the advancing direction of the paper tape and is carried by a nonconducting endless belt 8 so as to sweep across the paper at uniform speed. Another stylus 7, not visible in FIG. 1, is mounted on the other side of the endless belt 8 to commence its sweep travel from the top downwardly after the visible stylus 7 has left the bottom edge of the tape. Further details of the mechanisms are not illustrated and described herein because they are known as such, for example from U. S. Pat. Nos. 2,788,509 and 3,195,103.

Figure 1A:
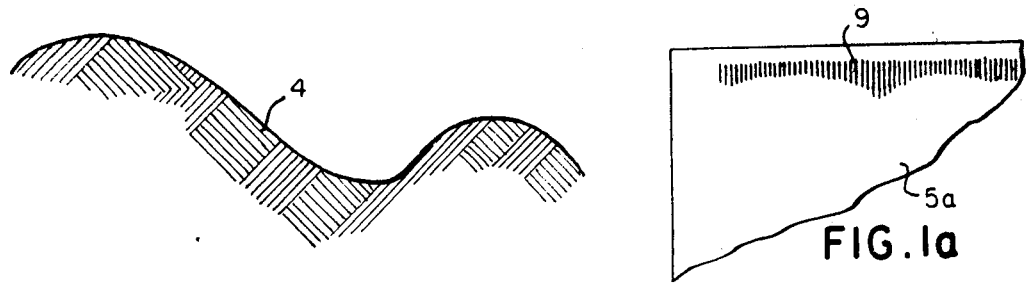
FIG. 1a shows for comparison a portion of a strip-chart record as obtained with known equipment when operating at shallow depth within the centimeter range.

If, for example, a 75 cm. sounding range is to be recorded on a tape of 15 cm. width, the stylus must sweep over this width in 1/1000 second (the speed of sound in water being about 1,500 m./sec). To operate at such a speed while preserving a continuous contact of the stylus point with the paper is unfeasible. In practice, therefore, such a short sounding range cannot be recorded with mechanically driven devices of this type, even though they have been found reliable for considerably longer measuring ranges. Under the most favorable conditions, the recording apparatus will produce no more than extended zero marks on the recording tape, such as those schematically shown at 9 on the piece of recording paper 5a in FIG. 1a. Such slightly extended zero marks, exhibiting extremely short distances between the end of the zero pulse and the beginning of the bottom echo at very shallow depths, do not offer a discernible indication as to the shape of the bottom surface. The interposition of a time expansion according to the invention, however, provides a remedy and furnishes an accurate bottom image 10 on a reduced scale as shown on the recording tape 5 in FIG. 1, the bottom traveled over by the vessel being indicated by a longitudinal contour obtained by continual sounding operations.

These sounding operations generally are effected in the conventional manner. A keyer 11 operating electronically or mechanically, for example by a contact actuated under control by the stylus transport belt 8, initiates the operation of an oscillator 12 which excites the emitting transducer 2. The short train of sonic, i.e., audible, or ultrasonic waves emitted into the water is reflected at the bottom 4, and the returning echo received by the transducer 3 is converted back into electrical signals which are amplified in a receiving amplifier 13. The two transducers 2 and 3, of course, may also be substituted by a single emitting-receiving transducer as known for example from U.S. Pat. No. 3,102,991. If the amplified echo pulses were directly recorded, the above-mentioned unsuitable echo diagram 9 on the recording tape 5a (FIG. 1a) would result whenever the depth of the water is extremely shallow.

According to the invention, however, the system of FIG. 1 is further provided with a triangular wave generator 14 which is controlled by the keyer 11 to initiate a triangular wave at the moment of pulse transmission. Furthermore, a pulse shaper 15a and a writing-pulse generator 15b are connected between the receiving amplifier 13 and the recording instrument. The delayed writing pulse thus produced furnishes the true-to-scale image 10 of the bottom. A strict proportionality of the time delay to the pulse travel time is secured as well as an exact positioning of the delayed writing pulse precisely at the end of the triangular voltage wave.

Preferably the triangular wave voltage is generated by first supplying a capacitor with a strictly constant charging current which is released by the emitter pulse, and then changing to a constant current discharge of the capacitor, released by the reception of the echo pulse. The resulting capacitor voltage during each individual charging-discharging period is triangular, having a linear ascending branch and a linear descending branch. FIG. 2 represents a time diagram in which such a capacitor voltage $U_C$ is plotted versus the travel time $t$ of the sonic pulse. Also shown in FIG. 2 along a separate time axis at the bottom of the diagram are the signal pulses occurring at different movements of the triangular voltage.

At the moment $t_o$—the commencement of the sounding period—a pulse 16 is emitted and simultaneously the capacitor voltage $U_C$ is increased from zero linearly along the branch 17 up to the moment $t_E$ when the echo pulse 18 arrives. Beginning at the moment $t_E$, the capacitor voltage $U_C$ declines linearly along the branch 19 and, when reaching its zero end, at the moment $t_s$ releases the writing pulse 20. The total period of time is expanded in this manner by the relation $t_s-t_o/t$ $E-t_o$ which, in the illustrated example amounts to 7:1. If during another sounding period an echo 21 arrived at a later moment $t_E'$, the triangle voltage $U_C$ would further increase along the branch 17a and then commence to decline linearly along the branch 19a thus releasing the writing pulse 20a at the much later moment $t_s'$. Again the time expansion corresponds to the ratio $t_s'-t_o/t$ $E'-t$ o=7:1.

It will be recognized from a geometric observation of the $U_c-t$ diagram in FIG. 2 that, generally, a strict proportionality obtains between the travel periods of the sonic pulses and the recorded intervals of time. That is, all of the sonic travel periods are expanded in the same ratio which in the exemplified case is 7:1. This results in a true-to-scale, geometrically similar image 10 of the bottom profile 4 in the echogram (FIG. 1). Besides, an indicating scale S (FIG. 1) of strictly linear division is afforded in the manner as customary for other distance ranges of echo sounding. For example, if a recording tape of 21 cm. width is used and the speed of the belt 8 is adjusted so that without time expansion the measuring range is 0–21 cm., i.e., 1 cm. corresponds to 1 meter, then the above exemplified sevenfold expansion results in a total measuring range of 0–3 m. Then a distance of 7 cm. on the paper corresponds to 1 meter in reality. This exemplifies the very short distances at which the invention still affords precise recordings.

Despite the linearity of the capacitor voltage such a precision of depth sounding systems can, in actual practice, be obtained only if the writing pulse 20 or 20a occurs exactly at the end moment $t_s$ or $t_s'$. If this time position of the writing pulse were not accurately defined or if it would not appear a more or less constant interval ahead of the correct moment (a constant advance of the releasing operation being desirable because a certain voltage level is required for releasing a writing pulse generator), then a measuring error might be encountered and this would be unbearable for the shortest distances of interest and would aggravate or obviate the evaluation of the magnified bottom contour 10 (FIG. 1) for practical navigation and depth-sounding purposes. According to my invention, therefore, the accurate time expansion according to FIG. 2 is secured by interposing an auxiliary voltage between the triangular wave voltage and the writing pulse, this being explained presently with reference to FIGS. 3a to 3d.

In the first horizontal series A of the diagrams shown in FIGS. 3a to 3d, the triangle voltage of FIG. 2 is repeatedly shown at 33. The second series B of diagrams represents the voltage-time curves 51a to 51d of an auxiliary voltage whose lagging (rear) flank 71a to 71d is much steeper than the declining branch of the triangular voltage wave. In the respective illustrations 3a to 3d, the four different auxiliary voltages have different wave shapes depending upon the different way of deriving them from the triangular voltage 33, but in each case the end of the auxiliary voltage wave coincides with the end moment $t_s$ of the original triangular voltage 33. If these auxiliary voltages exhibit an already sufficiently steep rear flank at the moment $t_s$, then this flank 71a–71b can be converted in known manner by differentiation to produce a peak or needle pulse 72a–72d at the moment $t_s$. Such needle pulses are shown in series D of FIGS. 3a to 3d. The needle pulses, upon current amplification by means of cathode-follower or emitter-follower circuits can be directly employed as writing pulses, or they may serve as trigger pulses for releasing a somewhat longer writing pulse 52a–52d as shown in series E.

If the triangular wave is greatly elongated, it is preferable to convert the triangular wave not directly into a rectangular wave as shown at 51a to 51c, but to first convert it to a trapezoidal wave 51d (FIG. 3d). The trapezoidal intermediate voltage is then converted to a second auxiliary voltage (line C in FIG. 3d) which has the preferred rectangular shape 73d with a very steep rear flank 71d situated at the time point $t_s$. Such a double pulse-shaping operation produces a greater sharpness of the voltage knee at the moment $t_s$.

The further needle pulses resulting from differentiation and corresponding to series D in FIGS. 3a to 3d can be made ineffective by short circuiting with the aid of diodes (negative needle pulses 74a–74e) or they may serve other purposes. For example, the needle pulse 75b or 75d which occurs at the moment $t_0$ and has the same polarity as the writing or trigger pulse (72b or 72d) may serve directly or as a trigger to produce the zero marker pulse 76b or 76d. (FIGS. 3b and 3d.)

The diagram series A to E in FIGS. 3a to 3d are coordinated to the system diagram of FIG. 1 as follows:

Triangle wave generator 14—series A
Pulse shaper 15a—series B or conjointly B and C
Writing pulse generator 15b—series D or conjointly D and E Described in the following are circuit arrangements which afford producing the pulse shapes according to FIGS. 3a to 3d.

As explained, the triangular wave 33 is to exhibit a linear ascent and a linear descent. Many known circuits are available for generating such a voltage by charging a capacitor with constant current. For example, the current is passed through a diode or triode operating in the saturated region of its characteristic. Also suitable as charging or discharging resistor is a pentode because its plate current is largely independent of the anode (plate) voltage which in this case is the capacitor voltage. Analogously applicable are cascade circuits, transistor circuits and particularly a transistor circuit in base configuration. There are further special circuits which secure a largely linear voltage course at the capacitor by applying a very intensive negative feedback; examples of such circuits are the Miller integrator or a bootstrap circuit. A novel circuit of this type, particularly well suitable for the purposes of my invention and also used in the other embodiments still to be described, is represented in FIG. 4.

The input 30 of the circuit in FIG. 4 receives a rectangular wave pulse of the length $t_0$–$t_E$ to be expanded. Such a rectangular pulse is obtainable by having the emitter pulse and the echo pulse of the sounding equipment successively trigger a bistable multivibrator. The rectangular pulse, by integration, is converted to a linearly ascending sawtooth branch and, together with the time-proportional linear discharge sawtooth branch, forms the triangular pulse 33 at output 34, this pulse being the one discussed with reference to FIG 2.

More in detail, the Miller integrator shown in FIG. 4 comprises three transistors $T_1$, $T_2$, and $T_3$ of which the two outer ones ($T_1$, $T_3$) operate in emitter-follower connection while the intermediate transistor $T_2$ operates in emitter connection. The base of the second transistor $T_2$ is galvanically connected with the emitter of the first transistor $T_1$, and the base of the third transistor $T_3$ is galvanically connected with the collector of the second transistor $I_2$. The emitter of the third transistor $T_3$ is connected through a capacitor C with the base of the first transistor $T_1$. A diode D is connected in series with a resistor $R_1$ to the base of the first transistor $T_1$ together with a high-ohmic drainage resistor $R_2$.

For explaining the performance, assume that the chosen transistors are of the NPN-type and that a positive voltage is first applied to the diode D. Then transistor $T_1$ is turned on and its emitter resistor $R_3$ is impressed by the positive voltage which also renders the transistor $T_2$ conducting. Due to the inversion of the emitter connection of $T_2$, the collector voltage of $T_2$ is nearly zero. Hence the second emitter follower constituted by $T_3$, is turned off. Further assume that this condition has been obtaining for a prolonged period of time so that the capacitive feedback over C is ineffective The negative pulse 31 (measured relative to the emitter of $T_2$) thus can reach the diode D and stresses it in the blocking direction, which renders the circuit branch of D and $R_1$ inactive during the subsequent events described presently. In lieu of the D–R branch, however, $R_2$ becomes effective because simultaneously with D the transistors $T_1$ and $T_2$ are both turned off. As a result and due to the inversion, $T_3$ starts conducting so that a positive voltage occurs at its emitter. Now the known feedback effect of the Miller integrator principle causes this positive voltage to be applied through C to the base of $T_1$, whereby the positive voltage delays the above-described blocking of the transistors $T_1$ and $T_2$. For that reason, the positive voltage increases at the collector of $T_3$, increases only slowly, which again causes a delay in the blocking effect of $T_1$ and $T_2$, and so forth. The increase with time of the triangular voltage 33 depends upon the dimensioning of the circuit components and, as a rule, becomes shallower with increasing values of $R_2$ and C. The maximum voltage at the emitter of $T_3$ is limited by the battery voltage of the direct voltage supply (not illustrated) for illustrated) for the transistors and by the residual voltage of the turned off transistor $T_3$ above the resistor $R_5$.

However, at the moment $t_E$ when an echo arrives, the normally extended negative pulse 31 is prematurely terminated and a positive voltage again reaches the diode D. This causes a reversal in the above-described events. The linear voltage increase at the emitter of $T_3$ is reversed, and the linear voltage decrease of the triangular voltage 33 commences, the writing pulse being released at the end $t_s$ of the voltage wave 33.

The time point $t$

E at which the descending branch of the triangular wave commences depends not only upon the capacitance of C but also upon the resistance of $R_1$, particularly upon the ratio $R_1:R_2$. (As a rule, the amplitude of the rectangular pulse 31, likewise affecting the position of time point $t_E$, remains constant and for that reason need not be considered). Consequently, it is readily possible, by adjustably varying these magnitudes, especially the resistances, to vary the scale expansion described with reference to FIG. 2. It is particularly possible to effect the constant current discharge of the capacitor C with only a fraction of the current intensity used for charging the capacitor. For this purpose, the resistance of $R_1$ is to be larger than the resistance of $R_2$. This results in the illustrated asymmetrical wave shape of the triangular voltage 33 which has a particularly strong expansive effect, the discharging time $t_E$–$t_s$ being longer than the charging time $t_0$–$t_E$. For example, if the time constant $T_e$ of the discharge is six times larger than that the time constant $T_a$ of the charging operation, there occurs an expansion $D=T_3+T_a/T_a$ in the amount of $D_7=6+1/1=7$ as is represented in FIG. 2. If the discharging time constant $T_e$ is nine times larger than the time constant $T_a$ of the charging current, the expansion amounts to $D_{10}=9+1/1=10$.

For operation with a simplified indicating scale, it is advisable to provide for a time expansion with the aid of an auxiliary voltage furnished by a pulse converter which comprises a rectangular wave pulse generator connected between the Miller integrator and the indicating or recording instrument, the rectangular wave pulse generator being released by the triangular wave of the Miller integrator at a discrete potential occurring shortly before the end of the triangular wave.

Particularly recommended for numerous applications is an expansion $D_5=4+1/1$. For example, if the first nonexpanded range covers a scale of 0–75 m. and the instrument is capable of operating with a second nonexpanded range by applying one-half of the sweep speed to the stylus-carrying belt 8 to cover a scale of 0–150 m., then the depth of the expanded recording in the first range (75 m.:5=15 m.) can be read off on the scale of the second nonexpanded range (0–150 m.) it is then only necessary to divide the scale value by 10.

For increasing the temperature stability it is advisable to provide the Miller integrator of FIG. 4 with a negative feedback from the emitter of transistor $T_3$ back to the base of transistor $T_2$. This negative feedback 70 with appertaining resistors $R_6$, $R_7$ is shown by broken lines in FIG. 4.

FIG. 5 shows a more sophisticated circuit diagram which comprises several refinements and improvements. The basic circuitry will first be described without reference to these refinements. The symbolic representation of further pulse stages, hereinafter described more in detail, also indicates the possibility of composing the entire circuitry of individual digital components obtainable in the trade as commercially available modules. To facilitate understanding the circuitry, it should be noted that the individual modules are of the PNP-type, with the exception of the Miller integrator 35 and the oscillator 53 which are both provided with NPN transistors The Miller integrator 35 in FIG. 5 preferably corresponds to FIG. 4. It is supplied with the output pulse of a bistable multivibrator 36. This pulse is to extend from $t_o$ to $t_E$; the multivibrator therefore is set to its normal state by receiving the emitter pulse or keyer pulse at the pulse input 37. Thereafter the multivibrator 36 is set to its other stable state by receiving an echo pulse at the second pulse input 38. As a result, the rectangular output pulse denoted in FIG. 4 by 31 is produced, and a time-proportional voltage change is then effected by integration of the rectangular pulse (in the Miller integrator). As a refinement of this circuitry portion, a trigger pulse converter 40 (Schmitt trigger) is interposed for the emitter or keyer pulse supplied to the terminal 39. The pulse converter 40 serves to secure exact rectangular pulses for a definite triggering of the bistable multivibrator 36. The same purpose is served by a further trigger pulse converter 41 which is interposed between the multivibrator 36 and the terminal 42 at which the echo pulse is received. Resistor $R_6$ permits adjusting the sensitivity or threshold value of the echo channel. Diodes $D_2$ and $D_3$ are separating diodes for the inputs of the trigger pulse converters 40 and 41. This permits applying to terminal 39 a negative voltage which is considerably larger than the negative operating voltage of the digital module 40, without causing damage to this module. Due to diode $D_3$, only the negative half-wave of the echo voltage to be amplified can act upon the digital module 41. The application of a positive bias voltage by means of $R_6$ produces a threshold voltage for zero point suppression and permits only sufficiently large echo voltages to become effective in controlling the electronic expansion. This prevents echo signals from fish and other small reflectors from erroneously causing the time expansion desired to occur only under control by the bottom echo.

A further refinement as to accuracy and reliability in response of the bistable multivibrator 36, is obtained by providing a monostable multivibrator 43. The multivibrator 43 is likewise triggered by the emitter or keyer pulse applied to the terminal 39 or by the output pulse of the coordinated pulse converter 40. After a predetermined period of time, the multivibrator 43 automatically triggers back to its original stable state. This pulse period is preferably adjustable, for example with the aid of an adjustable capacitor $C_2$. The output voltage of the monostable multivibrator 43 which is negative, the multivibrator being of the PNP-type, blocks the preparing input 44 of the bistable multivibrator 36. This prevents any spurious pulses (reverberation) which may occur in direct succession to the emitter pulse, from triggering the bistable multivibrator 36 back to the other state, thus making certain that this will occur only after elapse of the blocking period secured by the monostable multivibrator, so that the next triggering of the bistable multivibrator 36 will be due to the next expected useful echo.

After thus the Miller integrator 35 is impressed, at particularly high accuracy and reliability, with the rectangular pulse of the bistable multivibrator 36, extending between the moments of emitter pulse and echo pulse, the integrator 35 integrates this rectangular pulse and thus produces the triangular voltage 33a corresponding to the voltage wave 33 in FIGS. 3a to 3c. The triangular voltage occurring at the output 45 and being time expanded with good linearity and a high degree of control with respect to the echo travel time, is employed for releasing at its end the generator of the auxiliary voltage. For a release of best possible precision, there is provided a trigger pulse converter 46 (preferably a Schmitt trigger with silicon transistors) whose output pulse—if only moderate accuracy requirements are to be met—is already suitable as a writing pulse in the indicating instrument 47. It is preferably, however, to have an auxiliary voltage generator proper triggered by the steep leading flank of the output pulse from the converter 46.

The precision of the measuring results is further improved by additional components and circuits, also shown in FIG. 5, which will be described presently.

For adaptation to the data of the trigger pulse converter 46, which is provided as a digital module, a Zener diode ZD is connected between the Miller integrator 35 and the trigger pulse converter 46. The low Zener voltage furnishes an exact voltage standard for the defined release of the trigger pulse converter 46 at the end moment $t_s$ of the triangular voltage furnished from the Miller integrator 35. That is, if the coordinated emitter voltage (FIG. 4) drops below the predetermined value of the Zener voltage (relative to the emitter of $T_2$) or if the coordinated emitter voltage exceeds a negative value (relative to the battery voltage not entered in FIG. 4), then the trigger pulse converter 46 triggers from its state of rest and produces at the output 48 a positive rectangular pulse because its first NPN transistor no longer conducts but is turned off.

Simultaneously, the Zener diode ZD is used for exactly determining the expanded measuring value of the echo travel time. For these purposes the monostable multivibrator 49 is added to act as an auxiliary voltage generator, and a second monostable multivibrator 50 functions as the writing pulse generator.

The positive voltage jump of the trigger pulse converter 46 from its state of rest triggers the first monostable multivibrator 49 to its instable state for a constant interval of time whereafter the multivibrator 49 automatically returns to its original, stable state. The pulse length of the monostable multivibrator is adjustable within wide limits with the aid of an exchangeable capacitor $C_3$ and the nonillustrated base resistor. The time point, or rather the pulse length, is to be exactly adjusted in such a manner that the monostable multivibrator 49 will trigger back to its stable state when the triangular voltage 33 of the Miller integrator has decayed down to its end value at the moment $t_s$.

The end portion 19b of the descending branch of the triangular voltage according to FIG. 3a is again shown in FIG. 5a in time relation to the Zener voltage $U_{ZD}$ which very exactly determines the time point $t_r$ at which the trigger pulse converter 46 responds and furnishes a voltage whose positive leading flank triggers the first monostable multivibrator 49 so that the latter produces the compensating auxiliary voltage pulse 51 which transforms the very exact time point $t_r$ to the desired time point $t_s$. As a result, the geometric point $t_s$ according to the diagram shown in FIG. 2 is always attained at extreme electrical accuracy. As is also apparent from FIG. 2, the fact that the descending branch (19 or 19a) of the triangular voltage remains constant for different echo travel periods has the effect that the interval to be compensated by the rectangular pulse 51 (FIG 4) also remains constant for all occurring echo travel periods.

The lagging flank of the compensating pulse 51 triggers the second monostable multivibrator 50 which operates as the writing pulse generator and furnishes a short pulse 52, for example of 1 to 3 msec. length, already sufficient for exact recording operations.

Preferably, however, since the writing operation consumes power, a power stage 53 is interposed between the writing pulse generator and the recording instrument and is controlled to furnish electric power during a sufficient marking interval under control by the writing pulse 52. The power stage 53, in a preferred embodiment, is a keyed oscillator which permits the writing pulse 52 to oscillate during a short pulse duration. This produces a correspondingly short wave train to serve as the writing pulse proper, such a train being more readily applicable for supplying a sufficient amount of power. The short alternating-voltage pulse is supplied to the recording instrument 47 where it secures a clear and distinctive marking performance, namely good blackening if the stylus is of the writing type, or a clear flash illumination if a rotating noble gas lamp is used as an indicator.

As mentioned, the pulse stages according to FIG. 5 can be purchased as finished digital building blocks (modules). The internal circuitry and interconnection of these modules form part of the rudimentary knowledge in electrical engineering but will be briefly described in the following.

FIG. 6 is a circuit diagram of a monostable multivibrator with PNP-transistors, together with a broken line indication of optional additions which convert the same circuitry to a bistable multivibrator. In the latter case the plus (+) sign shown in parenthesis is indicative of the direct voltage sources for multivibrator operation. Denoted by $D_4$ is an isolating diode. The positive pulse for triggering the multivibrator from the stable state is to be applied to the terminal 60. If desired, such triggering can be prevented by applying a negative pulse to the terminal 61. This delays the triggering operation for the duration of the negative pulse as is described above with reference to the bistable multivibrator 36. The triggering back to the state of rest, in the case of the bistable multivibrator, is effected by applying a positive pulse or voltage jump at the terminal 62. The output pulse can be taken from terminal 63 or 64 depending upon the desired polarity.

FIG. 7 shows the known circuit of a Schmitt trigger to be used as a trigger pulse converter. Denoted by 65 is the input terminal and by 66 the output terminal.

FIG. 8 shows a keyable oscillator, the illustrated example being a Clapp oscillator, which is normally blocked by a negative bias at the grid of its tube, the bias voltage being applied to the terminal 67. In this known manner, any other oscillator may be blocked as well. The negative bias voltage is overcome by the positive writing pulse 52 (FIG. 5) applied to the terminal 68. Only during this short interval of time can the oscillator operate and furnish at the cathode or the output terminal 69 a corresponding short pulse in the form of an alternating-current writing pulse in a low-ohmic circuit.

The devices described in the following are coordinated to the diagrams of FIGS. 3b to 3d.

According to FIGS. 9 to 11, the auxiliary voltage 51b is obtained by differentiating the triangular voltage 33 in accordance with FIG. 3b. For this purpose, the devices shown in FIGS. 9 to 11 are provided with differentiating components 15c, 15d, 15e which form additional components of the auxiliary voltage generator 15a of FIG. 1. Repeated from FIG. 1 are the triangular wave generator 14 and the writing-pulse generator 15b.

The differentiating member 15c in its simplest configuration is designed as an RC member (resistor-capacitor in series), which of course may be substituted by an RL member (resistor-inductor in series). However, the voltage linearity of a capacitor is better than that of an inductance coil. For that reason, an RC member is preferred. The voltage along the resistor is proportional to the differential quotient of the applied voltage so that a single differentiation suffices to obtain the auxiliary voltage 51b from the triangular voltage to a more or less perfect extent. However, the wave shape of the auxiliary voltage 51b more closely approaches an exact rectangle the more steeply the descending branch of the triangular voltage is inclined. If this decline is shallow, it is more favorable to resort to additional expedients.

Thus, in FIG. 10 the differentiating member $C_8R_8$ is connected with a transistor $T_8$ operating, for example, in base configuration. As a result, the amplitude loss caused by the sole use of a passive two-pole $C_8R_8$ is compensated at least to a large extent. The use of the base configuration, compared, for example, with an emitter configuration of the transistor $T_8$, also results in better linearity of the current-amplifying gain. In the embodiment of FIG. 11, the linearity and stability are further improved by using a differentiating operation amplifier to serve as a differentiating auxiliary voltage generator 15e.

Operation amplifiers are commercially available as modules for analog computers. They exhibit a particularly high stability and good linearity by virtue of the fact that the output of the amplifier 71, having a high open-loop gain, is intensively feedback connected with the input by a negative feedback loop 72. The just-mentioned properties make operation amplifiers suitable not only for analog computers but, as has been found in conjunction with my invention, also for electronic scale expansion. This is because these amplifiers permit determining the time point $t_s$ (FIG. 2) with particular exactitude. The error of a linearly functioning operation amplifier (multiplication with constant coefficient) is inversely proportional to the product (for example, $4 \times 10_9$) of the open-loop amplification times the input resistance of the amplifier, and is proportional to the double value of the resistance (for example, $2 \times 200$ k$\Omega$) in the negative feedback loop, so that a very slight voltage amplitude error ($F=1\times10^{-4}$) can be attained. This manifests the remarkable accuracy which, by virtue of the invention, is exhibited by the time point $t_s$ in spite of the time expansion; such accuracy in electrical representation of the moment $t_s$ being decisive for the precision of the electronic scale expansion and hence also for the magnitude of the largest expansion factor that can be employed advantageously in actual practice. With a repeated provision of operation amplifiers (for example according to FIG. 13), the decisive end point $t_s$ of the triangular voltage becomes more and more sharply defined, even if the expansion in scale is so large that the inclination of the triangular voltage is rather shallow. For similar reasons, operation amplifiers are applicable at different other electrical localities in systems according to the invention, this being demonstrated, for example, at the triangular voltage generator 14, the auxiliary voltage generator 15e or 15g and/or the auxiliary pulse generator 15h.

The type of operation of the operation amplifier (adding-subtracting, multiplying with a constant factor, differentiating, integrating) is essentially determined by the electrical parameter data in the negative feedback loop and at the amplifier input. The RC members in device 15e (FIG. 11) at the input and in the feedback loop, effect a differentiating performance of the operation amplifier. The amplifier 71 proper is an ordinary, plural-stage amplifier of any conventional type so that it need not be further illustrated or described in this disclosure. However, a single-stage amplifier, which would be applicable at 71, is also shown in FIG. 10 as a transistor stage in base configuration, provided the time constant of $R_8C_8$ is chosen to be large in comparison with the signal duration so that the differentiation intended in the device of FIG. 10 will not take place.

As mentioned, the use of a high-gain amplifier 15f (FIG. 12) as the only auxiliary voltage generator will suffice to furnish a useful auxiliary voltage 51c (FIG. 3c), provided the amplifying gain is high enough and the triangular voltage 33 is not too shallow. For example, an amplifying gain of $10^3$ would render the descending branch 19b (FIG. 4) so steep that a minimal voltage level (for example corresponding to $U_{ZD}$) required for the subsequent derivation of the trigger pulse 72e would be coordinated to an inclination interval of as little as 1 μsec. for the rear flank 71c of high steepness, in lieu of 1 msec. (=75 cm. sounding distance corresponding to $t_o-t_E$, simplified to $t_i-t_s$ in FIG. 3a).

Highest accuracy is obtained by a combined method which requires composing the auxiliary voltage generator (15g) of a difference amplifier 73 and a differentiating operation amplifier (74), of which the latter is also an operation amplifier which acts as an inverter and performs a multiplication with a constant coefficient.

Difference amplifiers, applicable at 73 (FIG. 13), are known as such, the circuit diagram of a known amplifier being entered into the symbol shown separately in FIG. 13a. The exemplified amplifier comprises two transistors $T_9$ and $T_{10}$ with a common emitter resistor $R_9$. A control voltage can be applied to the respective bases so that the amplified and inverted difference voltage can be taken off at each of the two collector resistors $R_{10}$, $R_{11}$. Since the device is to form an operation amplifier, the output is connected to the input through a loop 75 (FIG. 13) to provide an intensively negative feedback action. Since the loop 75 and only one of the inputs contains an ohmic resistor $R_{12}$ or $R_{13}$, this amplifier 73 amplifies the one input voltage in the ratio of these two resistors with simultaneous inversion and consequently by the constant coefficient $-R_{12}/R_{13}$. With the presumed high open-loop amplification, the data of the amplifier itself become negligible so that, as mentioned, a very stable amplification will result. Since, however, the amplifying gain thus obtained is not by far as high as with the embodiment 15f (FIG. 12), the auxiliary voltage 51d (FIG. 3d) obtained by the system of FIG. 13 has sloping flanks although these are much steeper than those of the triangular voltage 33.

For further stabilization, the horizontal flattop of the trapezoidal voltage 51d is not produced by clipping the amplified triangular voltage with the aid of correspondingly controlling the amplifier 73 as is the case, for example, with the amplifier 15f, but is secured by utilizing the differentiating property of the amplifier 73 (FIG. 13) with the aid of a blocking direct voltage $U_K$ which is adjustable at a potentiometer 14 and impressed upon the second input of the amplifier. With transistors $T_9$ and $T_{10}$ of the same type, the triangle voltage and the direct voltage $U_K$ are supplied to the amplifier with mutually opposed polarities. If, however, the transistors $T_9$ and $T_{10}$ are of complementary types: NPN and PNP rather than being both, as shown, of the PNP-type, then the two input voltages are supplied at the same polarity. Due to the proper relative polarity of the two input voltages of amplifier 73, there appears only the lower end portion of the triangular voltage 33, this portion being decisive as to the time points $t_o$ and $t_s$, whereby the trapezoidal voltage 51d (FIG. 3) will result from a most stable and accurate amplification.

A further increase in flank steepness is secured by the differentiating operation amplifier 74 which corresponds to the amplifier 71 in the embodiment of FIG. 11 where it was used as the only amplifier and where it was sufficient because the original triangular voltage was satisfactorily steep so that an only small amount of time expansion and/or no more than moderate accuracy was required.

The writing-pulse generator 15b (FIG. 1) can also be employed in a system otherwise as shown in FIG. 13. At this point of the system, however, the accuracy can likewise be further increased by using a differentiating operation amplifier 76 as a component of the writing-pulse generator 15h (FIG. 13). The differentiating operation amplifier 76 furnishes the needle pulses D (FIG. 3d). According to a further development, the writing-pulse generator 15h is equipped with a monostable multivibrator 50 which corresponds to the one shown in FIG. 5 and described above. The output pulse 52d (FIG. 3d) of the monostable multivibrator 50 is supplied to the power stage 53, such as a keyable oscillator of relatively high power rating. The amplified power passes to the indicating or recording instrumentality 47.

A considerable advantage of the preferred embodiment according to FIG. 13 (and corresponding to FIG. 3d) resides in the fact that, in contrast to the embodiment of FIG. 5 (corresponding to FIG. 3a), the determination of the end point $t_s$ of the triangular voltage is not effected with the aid of an "amplitude discriminator" (46 in FIG. 5) but rather by ascertaining the change in the differential quotient of the triangular voltage. Thus utilizing the change in differential quotient of the triangular voltage involves a double differentiation. The first differentiation occurs in module 74 and results in the value $dU/dt$. The second differentiation takes place in module 76 and results in the formation of $d^2U/dt^2$.

For a linear ascent of the voltage to be differentiated the term $dU/dt$ corresponds to a positive constant, while for a linear descent it corresponds to a negative constant. Consequently, if, as in FIG. 3b, the triangular voltage 33 is directly differentiated, there will result an auxiliary voltage 51b which is a positive rectangular wave during the interval from $t_o$ to $t_E$, and which changes to a negative rectangular wave in the interval $t_E$ to $t_s$. The essential time point $t_s$ is identified by the flank 71b of the rectangular wave. The writing pulse 52b is derived by the second differentiation from the steep flank. With such a way of double differentiation directly starting from the triangular voltage, the difference amplifier 73 in FIG. 13 is dispensable.

This preferred combination of double differentiation greatly improves the measuring accuracy because slight differences in amplitude due to voltage fluctuations and temperature influences (causing a change in the current amplification and the working points at the transistors employed) have a falsifying effect in amplitude discrimination but not with double differentiation. An augmented advantage is obtained if, according to FIG. 3d, a second auxiliary voltage 51d having already steeper flanks is interposed prior to the first differentiation, whereafter the first differentiation produces the further auxiliary but now rectangular voltage 73d from which the writing pulse 52d is derived according to FIG. 3b by means of the second differentiation.

The use of known operation amplifiers in apparatus for electrical scale expansion to improve the indication of reflectors in echo sounding operations is not limited to the particular features exemplified by FIG. 13. For example, a highly accurate utilization of the triangular voltage terminal point $t_s$ (FIGS. 3a–3d) for most exacting requirements is attainable by providing in the triangular wave voltage generator 15a (FIG. 1) or 35 (FIG. 5) at least one inverting operation amplifier which also multiplies with a constant coefficient. This modification is achieved particularly if in the Miller integrator according to FIG. 4, an operation amplifier is provided in lieu of the two transistor amplifier stages represented by the transistors $T_2$ and $T_3$.

The invention is not limited to an expanded indication or recording of the type illustrated in FIG. 1 with reference to the recording tape 5, but is applicable in a versatile manner together with further indicating or recording instrumentalities. Such a combination is exemplified in FIG. 14 by a piece of recording tape 5b on which both the normal echo 80a and the expanded echo 10a are recorded in coordination to each other. This has the advantage of combining the information contents obtainable from both types of indication, without the need for additional recording paper. Due to the linear expansion, the combined operation also affords the assurance that the two recorded indications will not overlap or run into each other.

A property of the normal echo 80a that, despite the small scale of indication, can still be evaluated, resides in the length of the echo recording typical for the sea bottom. For example, the enlarged length 80b in the illustrated valley portion shows that a deeper layer of mud is present at this locality.

The expanded indication also affords better readability and improved information concerning the surface structure. Thus, the abrupt bulges at the right end of the expanded recording 10b justify the expectation that rocks are present at this locality because sandbanks of such a craggy contour would not persist in the current of water. Such rocks or boulders are not expectable from the much smoother contour of the normal echo 80a.

The combined indication exemplified by FIG. 14 is obtained by simultaneously supplying the writing pulse at the end of the auxiliary voltage together with the original, nonexpanded echo voltage, to the stylus or other indicating member. An example of apparatus operating in this manner is shown in FIG. 15. This apparatus largely corresponds to that of FIG. 1 but is further developed by branching from the output of the receiving amplifier 13 a direct line 81 which is connected by an AND-gate 83 with a line 82 coming from the writing-pulse generator 15b. The output of the gate 83 is connected to the indicating instrument 47a, such as with the stylus 7 in FIG. 1. An addition circuit can also be obtained by simply connecting the leads 81 and 82 with the indicating instrument and connecting isolating diodes $D_6$, $D_7$ or decoupling resistors at the junction point of the two leads.

It will be apparent from the above-described embodiments that a method and apparatus according to the invention afford expanding the imaging scale by electronic means at extreme precision. This electronic expansion circumvents the difficulty or unfeasibility of increasing the sweep speed of the stylus devices or other mechanically driven indicator but to nevertheless achieve a sufficiently resolved and exact indication of shallow depths or short distances. As a consequence, and by also permitting the reading of intermediate values, the invention offers the reliability and safety desired for use in practice.

To those skilled in the art it will be obvious upon a study of this disclosure, that a great variety of modifications with respect to circuitry and apparatus features can be made without departing from the essential features of my invention.

I claim:

1. An echo-sounding method for measuring short distances with the aid of a periodically moving indicator member by triggering the indicating operation of said indicator member in dependence upon the pulse travel time between the moments of emission and echo reception, which comprises the steps of generating a triangular wave voltage whose amplitude commences to increase at the moment of pulse emission and to decline from the moment of echo reception; providing concurrently with the triangular wave voltage an auxiliary voltage having a steep rear flank coincident with the end of the triangular wave; deriving a trigger pulse from, and coincident with, the rear flank; and controlling by said trigger pulse the indicating operation of the moving member, whereby a delay proportional to the length of said travel time is continuously interposed between echo reception and echo indication.

2. The method according to claim 1, which comprises generating said triangular wave voltage by supplying a capacitor with a constant current charge commencing with said pulse emission, and changing from said charge to a constant current discharge under control by, and commencing with, the moment of echo reception.

3. The method according to claim 2, which comprises supplying a normally inactive writing voltage for effecting said indicating operation of said moving member, and releasing said writing voltage to said member in response to said trigger pulse.

4. The method according to claim 1, which comprises generating said auxiliary voltage with a flattop wave shape.

5. The method according to claim 2, which comprises generating said auxiliary voltage with a flattop wave shape by comparing the descending branch of said triangular wave voltage with a discrete potential of the capacitor.

6. The method according to claim 4, which comprises generating said flattop voltage by differentiating the descending branch of said triangular wave voltage.

7. The method according to claim 4, which comprises generating said trigger pulse by differentiating said auxiliary flattop voltage.

8. The method according to claim 1, which comprise generating said triangular wave voltage by supplying a capacitor with a constant current charge commencing with said pulse emission, and changing at the moment of echo reception to constant current discharge at a current intensity that is a fraction of the charging-current intensity.

9. In the method according to claim 8 for an indicating instrumentality with two selective indicating ranges for long and short distance sounding, the product of the intensity ratio of charging to discharging current times the ratio of the long and short distance indicating ranges being equal to 10.

10. The method according to claim 1, which comprises generating said auxiliary voltage as a trapezoidal wave, and differentiating said trapezoidal voltage to derive therefrom a second auxiliary voltage of rectangular wave shape.

11. The method according to claim 1, which comprises applying to said indicating member an indication voltage controlled by and time-dependent upon the echo received at said receiving moment, in addition to controlling the indication by said trigger pulse at the end of said delay.

12. Echo-sounding apparatus for measuring short distances, comprising an indicating mechanism with a periodically moving indicator member, pulse emission and echo-receiving transducer means, and an electrical system connecting said transducer means to said indicating mechanism for triggering the indicating operation of said indicator member in dependence upon the pulse travel time between the moments of emission and echo reception; said system comprising a triangular wave voltage generator connected to said transducer means to have the wave amplitude commence to increase at the moment of pulse emission and to decline from the moment of echo reception, auxiliary voltage generator means connected to said triangular wave voltage generator to provide a flattop auxiliary voltage, having a steep rear flank, and trigger-pulse generating means for deriving a trigger pulse from said rear flank, said trigger-pulse generating means being interposed between said auxiliary voltage generator means and said mechanism for triggering the indicating operation of said member after a delay proportional to the pulse travel time elapsing between said emission and reception moments.

13. Apparatus according to claim 12, comprising a keyer connected to said transducer means and to said mechanism for synchronized control of the pulse emission and the periodic sweep movement of said member, a receiving amplifier connected to said transducer means for amplifying the echo pulse, said triangular wave generator having two inputs and an output, said inputs being connected to said keyer and to said receiving amplifier respectively, said triangular wave generator comprising a capacitor with constant current supply means for charging said capacitor upon receipt of an emitter pulse controlled by said keyer, and said triangular wave generator having a constant current discharge circuit controlled to start discharging said capacitor upon receipt of an echo pulse from said amplifier, said auxiliary pulse generator comprising a pulse converter connected to said output of said triangular wave generator to derive said auxiliary flattop wave from said triangular wave voltage.

14. In the apparatus according to claim 13, said triangular wave generator comprising a bistable multivibrator (36) to be triggered between its two stable states under control by said emitter and echo pulses respectively, and a Miller integrator (35) comprising said capacitor and being connected between said bistable multivibrator and said auxiliary voltage generator.

15. In apparatus according to claim 14, said Miller integrator (35) comprising three sequentially connected transistors of which the second one ($T_2$) is connected in emitter configuration and the two others ($T_1$, $T_3$ form emitter followers, said second transistor $T_2$ having its base galvanically connected with the emitter of the first transistor ($T_1$), the base of the third transistor ($T_3$) being galvanically connected with the collector of the second transistor ($T_2$) the emitter of the third transistor ($T_3$ being connected through said capacitor with the base of the first transistor ($T_1$), a diode (D) and an adjustable first resistor ($R_1$) being series connected to said base of said first transistor and an adjustable second resistor ($R_2$) for capacitor discharge being also connected to said first transistor base to be impressed with a rectangular wave pulse (31) supplied from said bistable multivibrator and lasting during the interval from emission to echo reception so as to block said first transistor during said interval, said two further resistors ($R_4$, $R_5$) connected as collector resistor of said second transistor and as emitter follower of said third transistor, whereby during said interval the increase in amplitude of the triangular wave voltage at either one of said further resistors is determined by the magnitudes of said capacitor (C) and said second resistor $R_2$) whereas the magnitude of said first resistor controls the decrease of said amplitude from the moment said diode (D) becomes conductive until said capacitor (C) is sufficiently discharged to cause an indication of the echo.

16. Apparatus according to claim 15, comprising a feedback connection between the emitter of said third transistor ($T_3$) and the base of said second transistors ($T_2$).

17. In apparatus according to claim 13, said triangular wave generator comprising a monostable multivibrator (43) having and input connected to said transducer means to be triggered by the echo pulse, a bistable multivibrator (36) triggerable between its two stable states by said emitter and echo pulses respectively, said monostable multivibrator having an output connected to said bistable multivibrator for blocking the latter by the monostable multivibrator pulse during an interval preceding the expectable useful echo, and a Miller integrator (35) comprising said capacitor and being connected between said bistable multivibrator and said auxiliary voltage generator.

18. Apparatus according to claim 12, comprising a threshold device ($R_6$) connected ahead of the triangular wave generator for substantially limiting the triggering of said triangular wave generator to response to the bottom echo.

19. Apparatus according to claim 14, comprising pulse converters (40, 41) for the emitter pulse and echo pulse respectively, said converters being connected ahead of the respective pulse inputs of said bistable multivibrator (36).

20. In apparatus according to claim 14, said auxiliary voltage generator means comprising at least one pulse converter (46, 49) having a rectangular output voltage and being connected between said Miller integrator and said indicating mechanism, said pulse converter being releasable by the triangular wave of said Miller integrator at a discrete potential ($U_{ZD}$) of said triangular wave prior to its end.

21. Apparatus according to claim 20, comprising a Zener diode (ZD) between said Miller integrator and said rectangular pulse converter (46) for determining said discrete potential ($U_{ZD}$)

22. In apparatus according to claim 20, said pulse converter comprising a Schmitt trigger (46) controlled by said triangular wave voltage, and a monostable multivibrator (49) connected to and triggered by the output pulse of said Schmitt trigger so as to temporarily furnish an auxiliary voltage (51, 51a) whose end moment ($t_r$) determined said discrete potential ($U_{ZD}$) ahead of the end moment ($t_s$ of said triangular wave voltage.

23. In apparatus according to claim 22, said trigger-pulse generating means comprising a monostable multivibrator (50) connected to said Schmitt trigger to be triggered thereby and having an output connected to said indicator member to furnish a writing pulse (52) therefore.

24. In apparatus according to claim 23, said trigger-pulse generating means comprising an oscillator between said monostable multivibrator (50) and said indicator member and keyed by the output pulse of said monostable multivibrator to furnish to said indicator member a short wave train to serve as the writing pulse.

25. Apparatus according to claim 12 comprising an operation amplifier (71, 73, 74, 76) in at least one of said voltage generator and generating means.

26. In apparatus according to claim 12, said auxiliary voltage generating means comprising a difference amplifier (73) which forms an inverting and constant-factor multiplying operation amplifier, and a differentiating operating amplifier connected to the output of said difference amplifier.

27. In apparatus according to claim 13, said triangular wave generator comprising a bistable multivibrator (36) to be triggered between its two stable states under control by said emitter and echo pulses respectively, and an integrator network comprising said capacitor and being connected between said bistable multivibrator and said auxiliary voltage generator, said network having a transistor stage, a diode (D) and an adjustable first resistor ($R_1$) being series connected to the base of said transistor, said capacitor and an adjustable second resistor being also connected to said base to be impressed with a rectangular wave pulse (31) supplied from said bistable multivibrator and lasting during the interval from emission to echo reception so as to block said transistor during said interval; an inverting and constant-factor multiplying operating amplifier connected to said transistor to be controlled by the output of said transistor stage, whereby during said interval the increase in amplitude of the triangular wave voltage at either one of said further resistors is determined by the magnitudes of said capacitor (C) and said second resistor $R_2$) whereas said operation amplifier controls the decrease of said amplitude from the moment said diode (D) becomes conductive until said capacitor (C) is sufficiently discharged to cause an indication of the echo.

\* \* \* \* \*